US010691299B2

(12) United States Patent
van den Broek et al.

(10) Patent No.: US 10,691,299 B2
(45) Date of Patent: Jun. 23, 2020

(54) DISPLAY OF HIERARCHICAL DATASETS USING HIGH-WATER MARK SCROLLING

(71) Applicant: Oracle International Corporation, Redwood Shores, CA (US)

(72) Inventors: Hendrik van den Broek, Lexington, MA (US); Blake Sullivan, Redwood City, CA (US); Max Starets, Lexington, MA (US); Chadwick Chow, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 244 days.

(21) Appl. No.: 14/863,786

(22) Filed: Sep. 24, 2015

(65) Prior Publication Data
US 2016/0092048 A1    Mar. 31, 2016

Related U.S. Application Data

(60) Provisional application No. 62/055,455, filed on Sep. 25, 2014.

(51) Int. Cl.
*G06F 3/0482*  (2013.01)
*G06F 3/0485*  (2013.01)
(Continued)

(52) U.S. Cl.
CPC .......... *G06F 3/0482* (2013.01); *G06F 3/0481* (2013.01); *G06F 3/0485* (2013.01); *G06F 9/451* (2018.02); *G06F 16/168* (2019.01)

(58) Field of Classification Search
CPC .... G06F 3/0485; G06F 3/0481; G06F 3/0482; G06F 17/30905; G06F 9/4443; G06F 9/451; G06F 16/168
See application file for complete search history.

(56) References Cited

U.S. PATENT DOCUMENTS

| | | |
|---|---|---|
| 5,226,117 A | 7/1993 | Miklos |
| 5,708,806 A | 1/1998 | DeRose et al. |

(Continued)

FOREIGN PATENT DOCUMENTS

| | | |
|---|---|---|
| CN | 1720703 | 1/2006 |
| CN | 1954575 | 4/2007 |

(Continued)

OTHER PUBLICATIONS

Chapter 6. Conversations and workspace management, downloaded from Internet http://docs/jboss.org/seam/1.1GA/reference/ec/html/conversations.html on Oct. 3, 2011, 10 pages.
(Continued)

*Primary Examiner* — Amy Ng
*Assistant Examiner* — Sajeda Muhebbullah
(74) *Attorney, Agent, or Firm* — Kilpatrick Townsend & Stockton LLP

(57) ABSTRACT

Techniques are disclosed for the efficient display of hierarchical datasets using high-water mark scrolling. Certain techniques allow for the creation of simple, intuitive, and computationally inexpensive user interfaces for displaying hierarchical data sets. According to some embodiments, a defined number of items of a hierarchical list are presented in a hierarchical user interface module. This defined number of items may be referred to as a "high-water mark" value. When one of the items having associated child items (that are not currently displayed) is selected, one or more presented items in the hierarchical list are replaced with a corresponding one or more of the child items, thus maintaining a same number of displayed list items (i.e., the high-water mark number of displayed list items).

8 Claims, 6 Drawing Sheets

(51) Int. Cl.
*G06F 16/16* (2019.01)
*G06F 3/0481* (2013.01)
*G06F 9/451* (2018.01)

(56) References Cited

U.S. PATENT DOCUMENTS

| | | | |
|---|---|---|---|
| 5,970,496 A | 10/1999 | Katzenberger | |
| 5,999,911 A | 12/1999 | Berg et al. | |
| 6,052,730 A | 4/2000 | Felciano et al. | |
| 6,061,697 A | 5/2000 | Nakao | |
| 6,286,129 B1 | 9/2001 | Agarwal et al. | |
| 6,380,957 B1* | 4/2002 | Banning | G06F 3/0481 715/825 |
| 6,418,471 B1 | 7/2002 | Shelton et al. | |
| 6,427,123 B1 | 7/2002 | Sedlar | |
| 6,430,538 B1 | 8/2002 | Bacon et al. | |
| 6,654,734 B1 | 11/2003 | Mani et al. | |
| 6,845,369 B1 | 1/2005 | Rodenburg | |
| 6,981,218 B1 | 12/2005 | Nagao | |
| 6,990,632 B2 | 1/2006 | Rothchiller et al. | |
| 7,024,622 B1 | 4/2006 | Young | |
| 7,124,358 B2 | 10/2006 | Carpenter | |
| 7,237,192 B1 | 6/2007 | Stephenson et al. | |
| 7,716,322 B2 | 5/2010 | Benedikt et al. | |
| 7,934,201 B2 | 4/2011 | Sweis | |
| 8,103,913 B2 | 1/2012 | Zambrana | |
| 8,892,635 B2 | 11/2014 | Sullivan et al. | |
| 8,924,934 B2 | 12/2014 | Sullivan et al. | |
| 9,015,226 B2 | 4/2015 | Sullivan et al. | |
| 9,225,617 B2 | 12/2015 | Sullivan et al. | |
| 9,250,872 B2 | 2/2016 | Sullivan et al. | |
| 2002/0087596 A1 | 7/2002 | Lewontin | |
| 2002/0147748 A1 | 10/2002 | Huang et al. | |
| 2003/0009562 A1 | 1/2003 | Heymann et al. | |
| 2003/0037108 A1 | 2/2003 | Peiffer et al. | |
| 2003/0221162 A1 | 11/2003 | Sridhar | |
| 2004/0133563 A1 | 7/2004 | Harvey et al. | |
| 2004/0193699 A1 | 9/2004 | Heymann et al. | |
| 2005/0071464 A1 | 3/2005 | Kuwata et al. | |
| 2005/0090924 A1 | 4/2005 | Hsu et al. | |
| 2005/0091510 A1 | 4/2005 | McKeon et al. | |
| 2005/0228621 A1 | 10/2005 | Matsuo et al. | |
| 2006/0005132 A1 | 1/2006 | Herdeg, III | |
| 2006/0031781 A1 | 2/2006 | Keohane et al. | |
| 2006/0112164 A1 | 5/2006 | Sawada | |
| 2006/0279571 A1 | 12/2006 | Mori et al. | |
| 2007/0043701 A1 | 2/2007 | Klementiev et al. | |
| 2007/0240118 A1 | 10/2007 | Keren | |
| 2007/0240125 A1 | 10/2007 | Degenhardt et al. | |
| 2007/0250601 A1 | 10/2007 | Amlekar et al. | |
| 2007/0271382 A1 | 11/2007 | Douiri et al. | |
| 2007/0282660 A1 | 12/2007 | Forth | |
| 2008/0092119 A1 | 4/2008 | Sweis | |
| 2008/0172598 A1 | 7/2008 | Jacobsen et al. | |
| 2008/0183753 A1 | 7/2008 | Maes | |
| 2008/0195819 A1 | 8/2008 | Dumont | |
| 2008/0317347 A1 | 12/2008 | Lim et al. | |
| 2009/0006627 A1 | 1/2009 | Castellucci et al. | |
| 2009/0007019 A1* | 1/2009 | Kobayashi | H04N 1/00244 715/838 |
| 2009/0049427 A1 | 2/2009 | Zhao | |
| 2009/0094552 A1 | 4/2009 | Watson et al. | |
| 2009/0106769 A1 | 4/2009 | Nakamura | |
| 2009/0125833 A1 | 5/2009 | Abernethy, Jr. et al. | |
| 2009/0198787 A1 | 8/2009 | Broda et al. | |
| 2009/0228775 A1 | 9/2009 | Sullivan et al. | |
| 2009/0319922 A1 | 12/2009 | Nooka et al. | |
| 2010/0031153 A1 | 2/2010 | Ortwein et al. | |
| 2010/0067113 A1* | 3/2010 | Harrison | G06F 17/30554 359/555 |
| 2010/0211893 A1 | 8/2010 | Fanning et al. | |
| 2010/0223557 A1 | 9/2010 | Kenney et al. | |
| 2010/0269062 A1* | 10/2010 | Kobylinski | G06F 3/0485 715/781 |
| 2010/0332920 A1 | 12/2010 | Ashida et al. | |
| 2011/0173589 A1 | 7/2011 | Guttman et al. | |
| 2011/0191676 A1 | 8/2011 | Guttman et al. | |
| 2011/0239104 A1 | 9/2011 | Prasad et al. | |
| 2011/0271173 A1 | 11/2011 | Aït-Mokhtar et al. | |
| 2012/0084133 A1 | 4/2012 | Ross et al. | |
| 2012/0102392 A1 | 4/2012 | Reesman et al. | |
| 2012/0166471 A1* | 6/2012 | Ramamurthy | G06F 17/30126 707/769 |
| 2012/0179743 A1 | 7/2012 | Sullivan et al. | |
| 2012/0179744 A1 | 7/2012 | Sullivan et al. | |
| 2012/0204091 A1 | 8/2012 | Sullivan et al. | |
| 2013/0104067 A1 | 4/2013 | Sullivan et al. | |
| 2013/0185240 A1 | 7/2013 | Ward et al. | |
| 2013/0238665 A1* | 9/2013 | Sequin | G06F 17/30126 707/797 |
| 2014/0282232 A1* | 9/2014 | Oh | G06F 3/0488 715/800 |
| 2015/0067547 A1 | 3/2015 | Sullivan et al. | |
| 2015/0188781 A1 | 7/2015 | Sullivan et al. | |
| 2016/0196009 A1 | 7/2016 | Sullivan et al. | |

FOREIGN PATENT DOCUMENTS

| | | |
|---|---|---|
| CN | 101366005 | 2/2009 |
| CN | 103348321 | 10/2013 |
| CN | 103348346 | 10/2013 |
| EP | 1041496 | 10/2000 |
| EP | 2661686 | 11/2013 |
| EP | 2661708 | 11/2013 |
| JP | 2007510200 | 4/2007 |
| JP | 2014508344 | 4/2014 |
| JP | 2014508986 | 4/2014 |
| JP | 5837940 | 12/2015 |
| WO | 2004057483 | 7/2004 |
| WO | 2012094339 | 7/2012 |
| WO | 2012154221 | 11/2012 |

OTHER PUBLICATIONS

Creating browser tab specific cookie, Bytes tech community, available at http:/lbytes.corn/topic/javascript/answers/878108-creating-browser-tab-specific-cookie, Dec. 27, 2009, 5 pages.
QPR Process Guide BPMN Modeling Guide, Version 7.6.1, 2007, http://wvvw.inst-informatica.pt/servicosiinformacao-e-documentacaoibiblioteca-digitaiigestao-de-si-ti-1/b.Qm/QPR~IrJ20ProcessGuide%20-%20BPMN°It)20Modeling,%20Guide.pdf, 2007, pp. 56-91.
Siebel Business Process Framework, Task UI Guide, Version 8.0, Dec. 2006 http://download.oracle.comidocs/cd/B40099 02/books/PDF/BPFWorkflow.pdf, 2006, pp. 92-239.
Allen, Seamless JSF, Part 2: Conversations with Seam, DeveloperWorks, May 2007,16 pages.
Brown et al., XML Schema: Formal Description, <http://www.w3.org/TR/2001/TR-xmlschema-formal/>, Sep. 2001, pp. 1-74.
Ducharme, Finding Relatives, <http://www.xml.com/lpt/a/2000/10/04/transforming/trxml5.html/>, Oct. 4, 2000, pp. 1-5.
Fallside, XML Schema Part 0: Primer, <http://www.w3.org/TR/2001/REC-xmlschema-0-2001-0502/>, May 2, 2001, pp. 1-74.
Hampton, Perl XML Quickstart the Standard SML Interfaces, http://www.xml.com/lpt/a/2001/05/16/perlxml.html/>, May 16, 2001, pp. 1-5.
Jiang, BigPipe: Pipelining web pages for high performance, Jun. 4, 2010, 5 pages.
Ogbuji, Validation XML with Schematron, <http://www.xml.com/lpt/a/2000/11//22/schematron.html/>, Nov. 2000, pp. 1-6.
Ray et al., Perl and XML, O'Reilly & Associates, Inc., First Edition, Apr. 1, 2002, pp. 16-18, 29-33, 118-119, 153-155.
Singh et al., RE:[xsl] getting the node position in source xml in a variable, http://www.xslt.com/html/xsl-list/2002-02/msg01283.html, Feb. 27, 2002, pp. 1-2.
St. Laurent, On Display: XMLWeb Pages with Mozilla, <http://www.xml.com/lpt/a/2000/03/29/tutorial/index.html/>, Mar. 29, 2000, pp. 1-9.

(56) References Cited

OTHER PUBLICATIONS

Tang et al., Closed-loop load balancing: comparison of a discrete event simulation with experiments, American Control Conference, Proceedings of the 2005 Portland, OR, USA Jun. 8-10, 2005, IEEE, Piscataway, NJ, USA, Jun. 8, 2005, pp. 2721-2726.
Van Der Vlist, Comparing XML Schema Languages, <http://www.xml.com/lpt/a/2001/12/12/schemacompare.html/>, Dec. 12, 2001, pp. 1-15.
Van Der Vlist, XML Linking Technologies, <http://www.xml.com/lpt/a/2001/10/04/linking/index.html/>, Oct. 4, 2000, pp. 1-15.
Wessendorf, Introduction to Oracle's ADF Faces Rich Client Framework, Jan. 22, 2009, pp. 1-5.
Chinese Application No. 201280008053.7, Office Action dated Dec. 2, 2015, 23 pages (13 pages of Original document and 10 pages of English Translation).
Chinese Application No. 201280008053.7, Office Action dated Jun. 20, 2016, 6 pages (3 pages of Original document and 3 pages of English Translation).
Chinese Application No. 201280008061.1, Office Action dated Feb. 2, 2016, 20 pages (8 pages of Original document and 12 pages of English Translation).
European Application No. 12701274.8, Office Action dated Mar. 11, 2016, 8 pages.
Japanese Application No. 2013-548467, Office Action dated Oct. 27, 2015, 5 pages.
Japanese Application No. 2013-548467, Office Action datedd Mar. 15, 2016, English Summary 1 page.
International Application No. PCT/US2012/020104, International Preliminary Report on Patentability dated Jul. 18, 2013, 9 pages.
International Application No. PCT/US2012/020104, International Search Report and Written Opinion dated Apr. 20, 2012, 12 pages.
International Application No. PCT/US2012/020106, International Preliminary Report on Patentability dated Jul. 18, 2013, 3 pages.
International Application No. PCT/US2012/020106, International Search Report and Written Opinion dated Mar. 7, 2012, 16 pages.
U.S. Appl. No. 10/136,698, Final Office Action dated Aug. 23, 2005, 13 pages.
U.S. Appl. No. 10/136,698, Final Office Action dated Nov. 15, 2006, 16 pages.
U.S. Appl. No. 10/136,698, Non-Final Office Action dated Apr. 11, 2006, 10 pages.
U.S. Appl. No. 10/136,698, Non-Final Office Action dated Feb. 9, 2005, 16 pages.
U.S. Appl. No. 10/136,698, Notice of Allowance dated Apr. 18, 2007, 8 pages.
U.S. Appl. No. 12/985,799, Final Office Action dated Oct. 23, 2013, 17 pages.
U.S. Appl. No. 12/985,799, Non-Final Office Action dated Apr. 16, 2013, 15 pages.
U.S. Appl. No. 12/985,799, Notice of Allowance dated Jan. 14, 2015, 9 pages.
U.S. Appl. No. 12/985,805, Final Office Action dated Sep. 10, 2013, 16 pages.
U.S. Appl. No. 12/985,805, Non-Final Office Action dated Feb. 21, 2014, 13 pages.
U.S. Appl. No. 12/985,805, Non-Final Office Action dated Feb. 25, 2013, 13 pages.
U.S. Appl. No. 12/985,805, Notice of Allowance dated Jul. 22, 2014, 8 pages.
U.S. Appl. No. 13/021,668, Final Office Action dated Jan. 16, 2013, 11 pages.
U.S. Appl. No. 13/021,668, Non-Final Office Action dated Aug. 2, 2012, 10 pages.
U.S. Appl. No. 13/021,668, Notice of Allowance dated Sep. 9, 2014, 18 pages.
U.S. Appl. No. 13/277,198, Final Office Action dated Jun. 17, 2014, 13 pages.
U.S. Appl. No. 13/277,198, Final Office Action dated Jun. 7, 2013, 16 pages.
U.S. Appl. No. 13/277,198, Non-Final Office Action dated Jan. 16, 2013, 14 pages.
U.S. Appl. No. 13/277,198, Non-Final Office Action dated Dec. 3, 2013, 16 pages.
U.S. Appl. No. 13/277,198, Non-Final Office Action dated Mar. 16, 2015, 17 pages.
U.S. Appl. No. 13/277,198, Notice of Allowance dated Sep. 25, 2015, 14 pages.
U.S. Appl. No. 14/658,488, Notice of Allowance dated Oct. 9, 2015, 12 pages.
U.S. Appl. No. 14/538,239, Notice of Allowance dated Sep. 28, 2016, 17 pages.
U.S. Appl. No. 15/011,043, Non-Final Office Action dated Apr. 5, 2018, 15 pages.
U.S. Appl. No. 15/011,043, Final Office Action dated Oct. 30, 2018, 21 pages.
European Application No. EP12701275.5, Office Action dated Jul. 31, 2018, 4 pages.

\* cited by examiner

FIG. 3

DISPLAY OF HIERARCHICAL DATASETS USING HIGH-WATER MARK SCROLLING

CROSS-REFERENCE TO RELATED APPLICATIONS

This Application claims the benefit of and priority to U.S. Provisional Patent Application No. 62/055,455, filed Sep. 25, 2014 and entitled "DISPLAY OF HIERARCHICAL DATASETS USING HIGH-WATER MARK SCROLLING," the entire disclosure of which is hereby incorporated by reference for all purposes.

FIELD OF THE INVENTION

Embodiments of the invention relate to the field of computing systems and user interfaces; and more specifically, to the efficient display of hierarchical datasets using high-water mark scrolling.

BACKGROUND OF THE INVENTION

One recent trend in the field of computing technologies includes the widespread production and use of "small" computing devices such as mobile consumer devices. These smaller devices, such as smartphones and tablets, are often small enough to fit into a pocket or purse and tend to have smaller displays and user input means when compared to more "traditional" desktop computing systems (e.g., personal computers or "PCs"). With these smaller displays, the screen "real estate" has been a primary focus of operating system and application designers. Screen real estate generally refers to an amount of space available on a display for applications to provide output. Typically, the effective use of screen real estate is one of the most difficult design challenges for application designers due to a desire to have a maximal amount of data and user interface elements (e.g., controls such as navigation icons, scrollbars, etc.) visible at one time to avoid a need for users to scroll (or otherwise navigate away) from a main focus of the application. However, the desire to present as much information at one time has led to drawbacks in that large amounts of information being presented at one time can be overwhelming and thus confusing to the user.

Further, complex user interfaces are also often very resource intensive from the perspective of the application and computing device resources. In particular, using complex menu systems and graphics in user interfaces is often computationally expensive and can require significant memory (e.g., RAM) usage and processor utilization for rendering and providing interactivity. For example, some web applications (i.e., applications presented using web technologies such as HTML, CSS, JavaScript, etc.) present complex user interfaces and require the insertion and management of huge amounts of DOM (Document Object Model) objects. The DOM is a programming interface that provides a structured representation of a document (i.e., a tree) that defines a way that the structure can be accessed from programs so that they can change the document structure, style, and/or content. However, when the DOM tree includes a huge number of objects (or "nodes" in the tree), further manipulation of the DOM tree becomes computationally expensive as many nodes must be frequently traversed and/or updated to perform even simple tasks.

Accordingly, effective, intuitive, and computationally inexpensive user interface configurations and techniques for presenting data—both simple and complex—are always strongly desired.

BRIEF SUMMARY OF THE INVENTION

The present disclosure relates generally to computing systems and user interfaces; and more specifically, to the efficient display of hierarchical datasets using high-water mark scrolling techniques. Certain techniques are disclosed herein that allow for the creation of simple, intuitive, and computationally inexpensive user interfaces for displaying hierarchical data sets.

According to some embodiments, a defined number of items of a hierarchical list are presented in a hierarchical user interface (HUI) module. In some embodiments, this defined number of items is referred to as a "high-water mark" value. When one of the items having associated child items (that are not currently displayed) is selected, one or more presented items in the hierarchical list are replaced with a corresponding one or more of the child items, thus maintaining a same number of displayed list items (i.e., the high-water mark number of displayed list items).

Accordingly, embodiments of the invention provide several features such as intuitive user interfaces that are simple for users to comprehend. Embodiments also allow for hierarchical list navigation and display without increasing an overall size of the displayed list, which does not require additional memory or processor resources for presenting the list.

The foregoing, together with other features and embodiments will become more apparent upon referring to the following specification, claims, and accompanying drawings.

BRIEF DESCRIPTION OF THE DRAWINGS

FIG. 3 illustrates additional exemplary usage scenarios of a hierarchical user interface module displaying a hierarchical dataset with more than two levels using high-water mark scrolling according to some embodiments of the present invention.

DETAILED DESCRIPTION OF THE INVENTION

Figure 1:
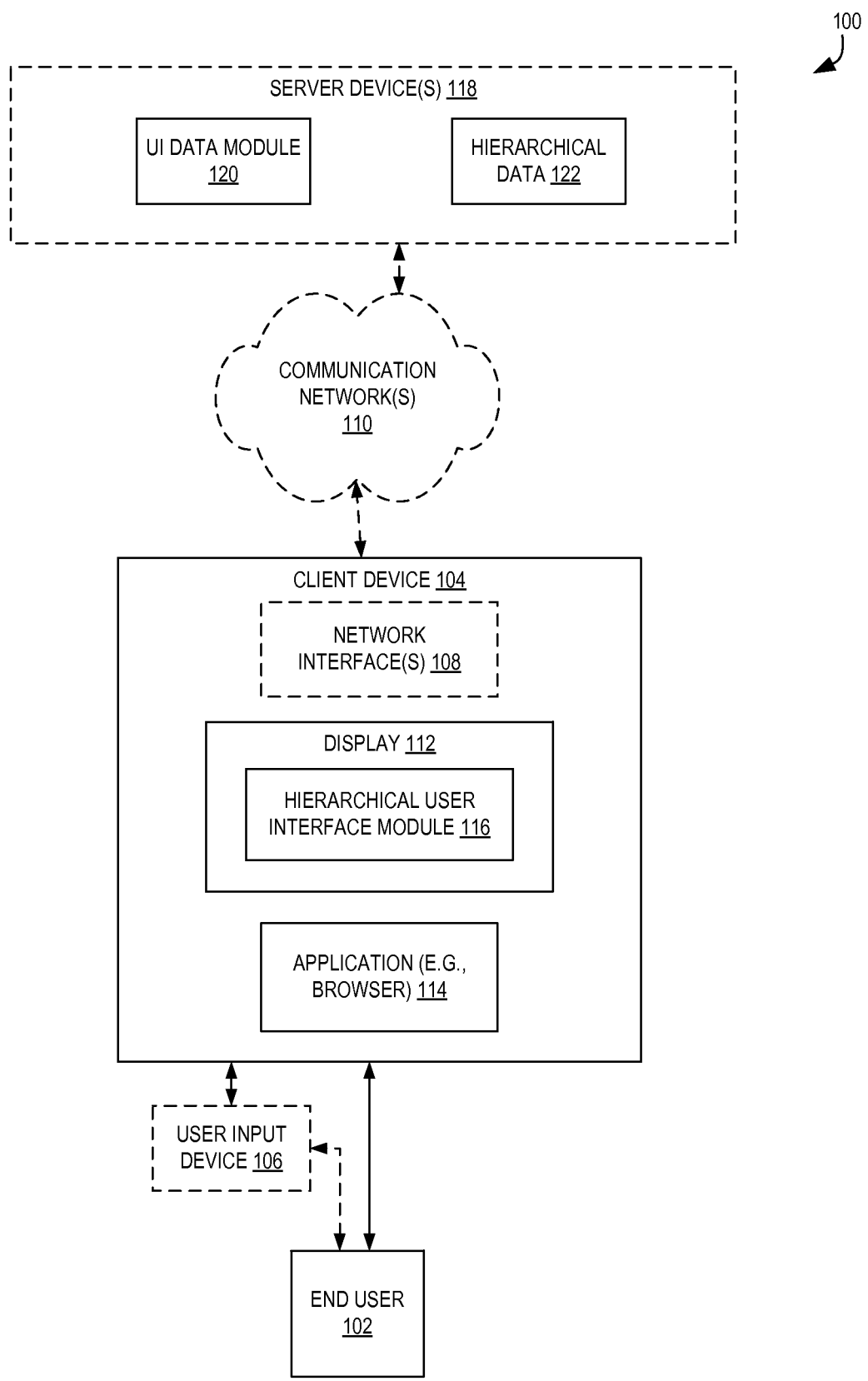
FIG. 1 illustrates a simplified high level block diagram and conceptual overview of a system 100 for displaying hierarchical datasets using high-water mark scrolling according to some embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

For the purposes of this disclosure, the terms "parent," "child," "hierarchy," "level", "node", and the like, may be used according to their typical use with respect to hierarchical "tree" structures commonly used in computer science and other fields. As a high-level introduction, a tree is a representation of multiple elements and their inter-relationships. However, for purposes of this disclosure, the use of terms do not require or otherwise imply that a tree structure must have only one "root" node. Instead, many embodiments disclosed herein are directed toward hierarchical lists that may have many nodes at a first (or "top") level of the hierarchy, and one or potentially more additional levels of "child" nodes dependent thereupon. Similarly, the use of these terms do not require or imply that all nodes must be a parent or child. For example, one or more nodes at a particular level may not be inter-related to any other nodes.

According to some embodiments, a defined number of items of a hierarchical list are presented in a hierarchical user interface (HUI) module. In some embodiments, this defined number of items is referred to as a "high-water mark" value. When one of the items having associated child items (that are not currently displayed) is selected, one or more presented items in the hierarchical list are replaced with a corresponding one or more of the child items, thus maintaining a same number of displayed list items (i.e., the high-water mark number of displayed list items).

Accordingly, in some embodiments, a need to display additional list items (e.g., child items of a presented list item) does not result in extra items needing to be displayed and managed overall due to the removal of a similar number of previously-displayed items.

In some embodiments, the high-water mark value may be changed, and thus additional list items will be displayed. For example, a list with an initial high-water mark value of 25 items may be changed to display 30 (or 50) items, for example, and thus the high-water mark value is adjusted to 30 (or 50). However, in some embodiments, when one of the 30 list items is selected—and thus child items of that selected list item are to be displayed—one or more of the displayed 30 list items will be replaced with one or more of the child items. Thus, in some embodiments, the high-water mark value is not changed, and may be set based upon a size of a fixed viewport available for the HUI module.

In some embodiments, fewer than all of the child items of a selected item will be displayed based upon the high-water mark value. For example, consider a selection of item number 8 in a list with a high-water mark value of 10 (i.e., 10 items in the list are currently displayed). If item number 8 has only one child item, in some embodiments the one child item will replace the previously-displayed item number 9, which will be "bumped down" and replace the previously-displayed item number 10. Thus, the previously-displayed item number 10 is no longer displayed.

In some embodiments, if item number 8 instead had two child items, these two child items would replace both previously-displayed list items 9 and 10. However, in some embodiments if item number 8 had more than two child items, only the first two child items would be displayed (i.e., replacing previously-displayed list items 9 and 10) because the number of displayed list items would reach the high-water mark value of 10. At this point, in some embodiments a user interface element is provided to the user that, upon its selection, allows the user to increase the high-water mark value, and thus display additional child nodes of item number 8 and possibly the previously-replaced original list items 9 and 10.

In some embodiments, a "maximum node value" may be configured such that the high-water mark value may be updated, but will "max out" at the maximum node value. Accordingly, with a maximum node value set to 500 nodes, for example, there will never be more than 500 nodes displayed.

Accordingly, some embodiments provide several features such as intuitive user interfaces that are simple for users to comprehend and use. Embodiments also allow for hierarchical list navigation and display without increasing an overall size of the displayed list, which does not require additional memory or processor resources for presenting the list, and does not require additional screen real estate to be used.

While certain embodiments are disclosed describing the presentation of hierarchical datasets using high-water mark scrolling, this is not intended to be restrictive. Accordingly, the teachings disclosed herein can also be applied to other types of software-based applications, displays, and environments.

FIG. 1 illustrates a simplified high level block diagram and conceptual overview of a system 100 for displaying hierarchical datasets using high-water mark scrolling according to some embodiments. According to some embodiments, hierarchical datasets may be displayed within a hierarchical user interface (HUI) module 116 via display 112 of a client device 104.

The client device 104, and other computing devices used in this system (e.g., server devices 118), may be of various different types including, but not limited to, personal computers (PCs), desktops, mobile or handheld devices such as laptops, mobile phones, tablets, etc., and other types of devices. In some embodiments, the display 112 is a part of the client device 104, such as in embodiments where client device 104 is a tablet, smartphone, kiosk, wearable computer (e.g., Google Glass® head-mounted display) or "all-in-one" PC. In other embodiments (not depicted) the display 112 may be a separate device from a client device 104 that the end user 102 provides input to, and may comprise a television, monitor, or projector connected to a PC or other computer (e.g., a single-board computer such as a Raspberry Pi), laptop, media system, disc player (e.g., Blu-Ray or DVD), and the like.

In some embodiments, the HUI module 116 is generated and updated by an application 114 executed by the client device 104. The application 114 may be any of many different types of applications that need to display hierarchical data, such as a firmware software module of the client device 104, an operating system application (or portion thereof), a user-space application, etc. For example, the application 114 may be a native application configured to be executed by a particular operating system, a portable application such as a Java-based application, a web browser, an application executed by a web browser, a video game, a word processing or office productivity application, presentation software, etc.

In some embodiments, the data underlying the displayed hierarchical datasets is provided from a UI data module 120 of one or more remote server devices 118. This hierarchical data 122 may be stored within one or more data structures and accessed by the server devices 118, such as flat files, databases, etc. In some embodiments, the UI data module 120 executed by the server devices 118 may transmit the data across one or more communication networks 110 to the client device 104, which receives the data at its one or more network interfaces 108. Of course, in some embodiments no remote communications are utilized, and the hierarchical data 122 is stored at the client device 104 (or at a computer-readable storage medium coupled with the client device 104) and "directly" accessed by the application 114.

In those embodiments including remote server devices 118, the one or more communication networks 110 facilitate communications between the client device 104 and the server devices 118. The one or more communication networks 110 can include networks of various types, each possibly including one or more networking devices or equipment including but not limited to network switches, routers, bridges, load balancers, etc. Examples of one or more communication networks 110 include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks 110 including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols.

Turning back to the client device 104, as one example, the application 114 may be a web browser that is configured to display the HUI module 116 based upon code included within (or identified by) received webpages. A webpage typically comprises one or more types of code, including but not limited to HTML (HyperText Markup Language) code, CSS (Cascading Style Sheets) code, JavaScript code, etc., for instructing the browser how to present the webpage to the end user 102. The webpage itself may include additional URLs of additional resources (e.g., images, additional code, video), which are also retrieved by the browser. When the browser has retrieved all necessary resources, it "outputs" or "presents" the webpage by rendering some or all of the webpage, and displaying it via a display 112. Examples of browsers include without restriction various versions of Internet Explorer (IE) by Microsoft™, Safari by Apple™, Chrome by Google™, Firefox by Mozilla™, Opera by Opera Software ASA, and others. Of course, although this one example is presented with respect to browsers and webpages, in other embodiments the HUI module 116 displays hierarchical datasets using high-water mark scrolling in other software applications as described above.

Once the HUI module 116 has been output via the application 114 (e.g., browser) on the client device 104 display 112, the end user 102 of the client device 104 may interact with the HUI module 116 in various ways using one or more input mechanisms provided by the client device 104. These input mechanisms may be part of the client device 104 (e.g., a touchpad, built-in keyboard, microphone, camera, or where the display 112 comprises a touch-enabled display) or an external user input device 106 connected to the client device 104 (e.g., a mouse, a keyboard, a microphone, camera, etc.).

However, the system 100 of the embodiment depicted in FIG. 1 is merely one example and is not intended to unduly limit the claimed embodiments of the present invention. Thus, one of ordinary skill in the art would recognize many possible variations, alternatives, and modifications to this illustrated system 100.

Figure 2:
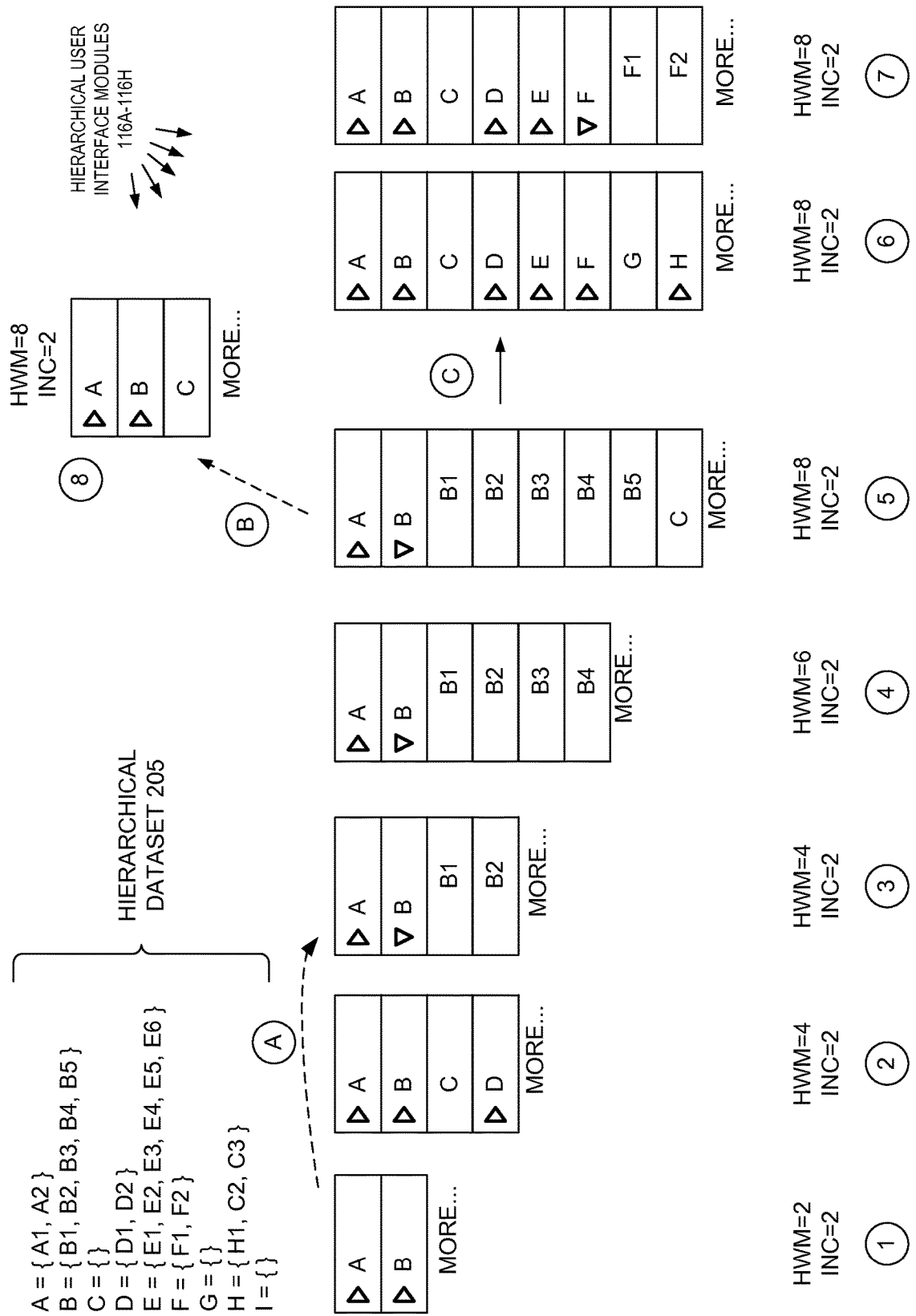
FIG. 2 illustrates exemplary usage scenarios of a hierarchical user interface module displaying a hierarchical dataset using high-water mark scrolling according to some embodiments of the present invention.
Figure 3:
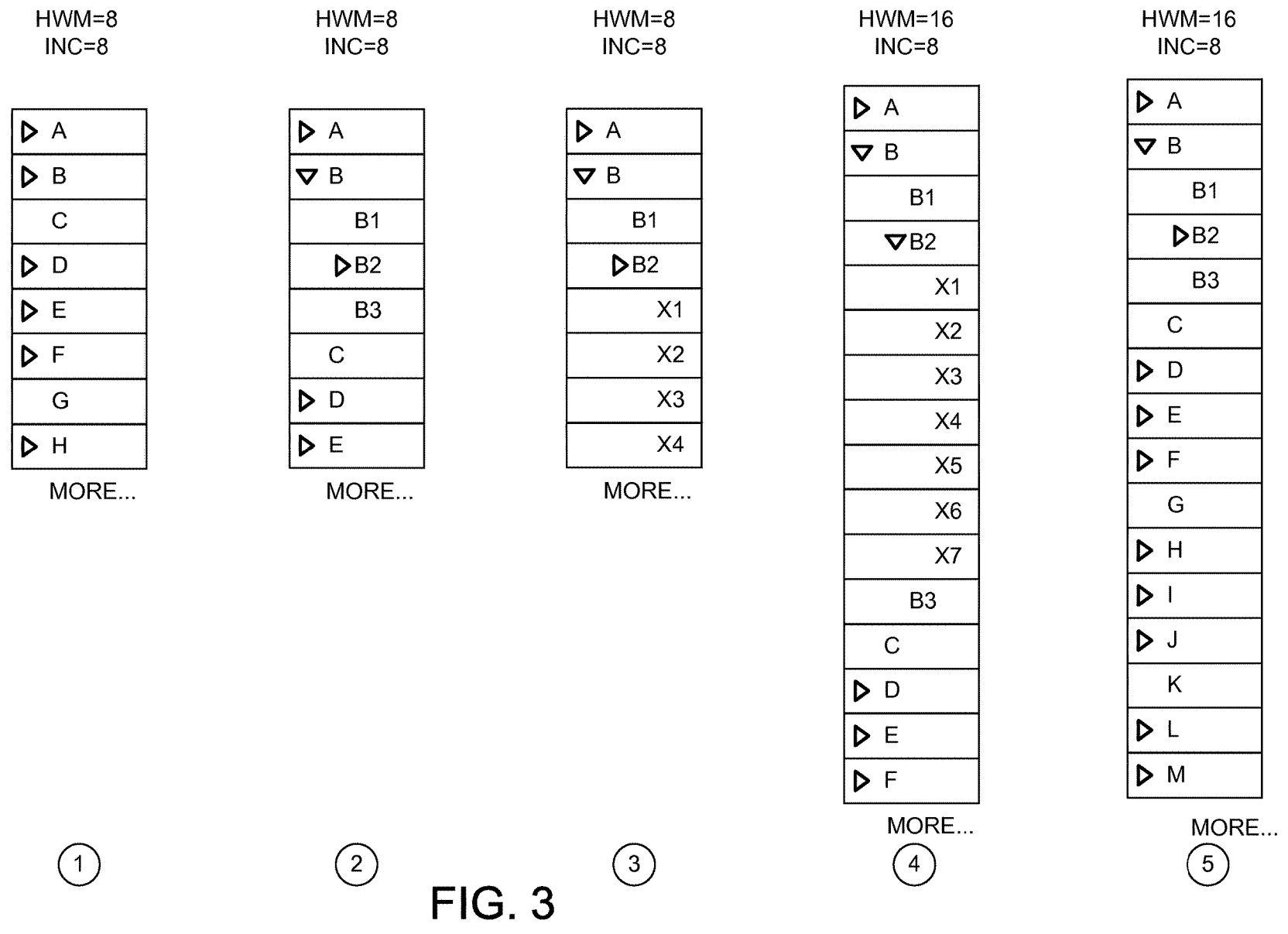

Having described several system configurations useful in displaying hierarchical datasets using high-water mark scrolling, we now turn to some exemplary use scenarios as illustrated in FIG. 2 and FIG. 3.

FIG. 2 illustrates exemplary usage scenarios of a hierarchical user interface module displaying a hierarchical dataset using high-water mark scrolling according to some embodiments of the present invention. Each of circles '1' to '8' displays a different display of the HUI module at different points of time based upon different user interactions with the HUI module. This example assumes an underlying hierarchical dataset of 205 with 9 items (or nodes) at a first level of the hierarchy, and a total of 20 items at a second level of the hierarchy. For example, item 'A' of the first level has two child items represented by 'A1' and 'A2'. Additionally, item 'C' of the first level does not have any child items. Of course, although this example includes a hierarchy of only two levels, in other embodiments the HUI module may perform similar operations for displaying datasets having more hierarchy levels.

In some embodiments, the data for the nodes (e.g., the hierarchical dataset 205 data) may be retrieved, by the client device 104 from the UI data module 120, all at once. In other embodiments, when additional or different nodes are to be added to the HUI module, the client device 104 may transmit requests (e.g., AJAX requests) to the UI data module 120 for portions of the hierarchical dataset 205 (e.g., information related just to the added nodes, for example). Thus, the GUI module may thus be updated with dynamic data received "on-the-fly" from the UI data module 120.

In this illustrative example, each item (or "node") of the HUI module that has child items associated with it is adorned with (or includes) an indication (or an "affordance") of the existence of the child nodes. In other embodiments, though, the nodes that do not have children are marked with an indicator or affordance. In various embodiments, the affordance may be a change of color of the node or portions thereof, an overlay of a graphic, an animation associated with the node (a sunburst or wiggle), etc. In this embodiment, the indication/affordance is a small triangle placed within the node of each item. In some embodiments, this indication is modified (e.g., rotated) when that particular node has been selected (see item 'B' at circle '3').

In this example, an initial high-water mark value (or "HWM") is set at 2, and changes with time based upon a highest number of nodes that have been displayed. Additionally, this example illustrates the use of an increment value (or "INC") which is also initially set to 2.

The increment value indicates a number of additional items that will be added to the list of the HUI module when it is determined that additional items need to be added. This determination that additional items need to be added may be based upon a user selecting a particular user interface element (e.g., the "MORE . . . " text shown herein) or may be detected by the code underlying the HUI module based upon the occurrence of an event (e.g., the user has "scrolled" the display (of the application, or of the HUI module itself) to a particular point (e.g., the beginning and/or end of the HUI module). This determination may be referenced herein as a "list expansion event." When this determination occurs, the HUI module is updated to include an additional number of items in the list, where this additional number of items is equal to the increment value (here, 2). In some embodiments the initial high-water mark value is equal to the increment value, but in other embodiments, these values differ.

At circle '1', the initial HUI module is displayed with two items. Here, the two items are the first two items of the hierarchical dataset 205—"A" and "B". In an embodiment, the initial display is based upon a configured high-water mark value. In an embodiment, the high-water mark value is set based upon a size of a viewport available for the HUI module, and may be set with a value that fills the available viewport with items such that all items are fully visible.

Supposing that a list expansion event occurs at circle '1'—based upon the increment value of 2—the HUI module is updated with 2 additional items from the hierarchical dataset 205. In this embodiment, the next two items of the first level of the hierarchy are inserted into the HUI module—items 'C' and 'D'—and the high-water mark value is incremented based upon the increment value from 2 (by adding 2) to yield 4.

At this point, based upon the view of the HUI module at circle '2', we suppose that the end user has selected the node for item 'B', and thus desires to view child nodes of item 'B.' In this case, we see from the hierarchical dataset 205 that item 'B' as five children. However, based upon A) the high-water mark value being 4, and B) the fact that there are two item locations in the HUI module underneath item 'B' (i.e., nodes 'C' and 'D' are below node 'B'), only the first two children of 'B' will be inserted into the HUI module. In this embodiment, nodes 'B1' and 'B2' (of the second level of the hierarchy) replace nodes 'C' and 'D' (of the first level of the hierarchy), which are dropped completely from display.

Of course, as indicated by the dashed arrow at circle 'A', flow could have proceeded from circle '1' to circle '3' if the end user had initially selected node 'B'. In that case, since node 'B' was the last node in the list, there would be no room in the list to replace any nodes below node 'B', and thus an implicit "list expansion event" is triggered simultaneously with the expansion of child nodes of item 'B'. Thus, the high-water mark value is incremented (by the increment value of 2) from 2 to 4, which provides two "slots" available for the first two children nodes of 'B'-'B1' and 'B2'—to be inserted into the list.

At this point (i.e., at circle '3'), we assume that a list expansion event has been triggered, and the high-water mark value is increased to 6. Since the last node in the list is a child node and further, since not all the child nodes of item 'B' (i.e., not all the sibling nodes of 'B1' and 'B2') have been displayed, the next two child nodes are retrieved and populated into the list as node 'B3' and node 'B4.' (If, however, B only had two child nodes B1 and B2, or if the last node in the list was a node of the first level of the hierarchy, the next two nodes from the first level of the hierarchy—C and D—would have been retrieved and displayed.)

Now, at circle '4' we assume that another list expansion event has been triggered (e.g., the end user clicks or otherwise selects the "MORE . . . " user interface element, or the end user scrolls to the bottom of the HUI module, for example). Based upon the increment value of 2, the high-water mark is increased from 6 to 8. Since only one remaining child node of B remains (B5), it is fetched and displayed in the list, and also the next first level node (C) is fetched and displayed in the list.

We now turn to two examples of configuration possibilities for handling list contraction events, such as when the end user seeks to "hide" the children of node 'B.' This list contraction event may occur by the end user clicking or otherwise selecting node 'B', though in some embodiments there are other ways of triggering such an event by interacting with other user interface elements, for example.

Assuming the list contraction event for node 'B', if we follow the dashed arrow at circle 'B' up to circle '8', we see one possibility where all the child nodes of node 'B' are removed from the HUI module. In some such configurations, the high-water mark value may remain at 8, or it may be re-set to be equal to the current number of nodes illustrated (e.g., 3).

Alternatively, following the solid arrow at circle 'C', all the child nodes of node 'B' are removed from the HUI module and are replaced with an equal number of the next first level nodes of the hierarchical dataset 205. In this example, node 'C' would replace node 'B1', and then nodes 'D' to 'H' would follow.

From circle '6' to circle '7', we now assume that the end user has selected the node for item 'F', and thus desires to view child nodes of item 'F.' In this case, we see from the hierarchical dataset 205 that item 'F' has two children nodes 'F1' and 'F2.' Because there are two nodes beneath node 'F' in the HUI module, both of the children nodes 'F1' and 'F2' will be retrieved and will replace nodes 'G' and 'H'.

FIG. 3 illustrates additional exemplary usage scenarios of a hierarchical user interface module displaying a hierarchical dataset with more than two levels using high-water mark scrolling according to some embodiments of the present invention. In this illustrated example, we assume a high-water mark value set to 8 and an increment value also set to 8.

At circle '1', eight first level nodes are displayed—A, B, C, D, E, F, G, and H. We then assume, from circle '1' to circle '2', that the end user has selected node 'B' and thus desires to view its child nodes.

In this sample, node 'B' has three direct children at the second level of the hierarchy—B1, B2, and B3. At circle '2', according to the high-water mark scrolling techniques disclosed herein, these three nodes are inserted into the list, pushing nodes C, D, and E down, and dropping nodes F, G, and H, due to the high-water mark value.

As indicated by the affordance at node 'B2', we know that node 'B2' itself has child nodes, which would be at the third level of the hierarchy. From circle '2' to circle '3', we assume that the user has selected node 'B2' and thus desires to view child nodes of 'B2'. At circle '3', the first four child nodes of 'B2' (i.e., nodes X1, X2, X3, and X4) are inserted and thus replace nodes B3, C, D, and E.

From circle '3' to circle '4', we assume that a list expansion event is determined to have occurred (e.g., the end user selects the "MORE . . . " user interface element or scrolls to the bottom of the HUI module), and thus the number of items in the HUI module is expanded from the high-water mark value of 8 to 16 (based upon the increment value of 8). Accordingly, the next 8 items in the dataset are retrieved and inserted into the HUI module list—the remaining third level child nodes of B2 (i.e., X5, X6, and X7), the remaining second level child node of 'B' (i.e., node B3), and the next four first-level nodes C, D, E, and F.

From circle '4' to circle '5', we assume that the user has triggered a list contraction event by "hiding" the child nodes of node B2. In this case, the third-level child nodes X1-X7 are removed from the HUI module, and the next first-level nodes G, H, I, J, K, L, and M are inserted.

Figure 4:
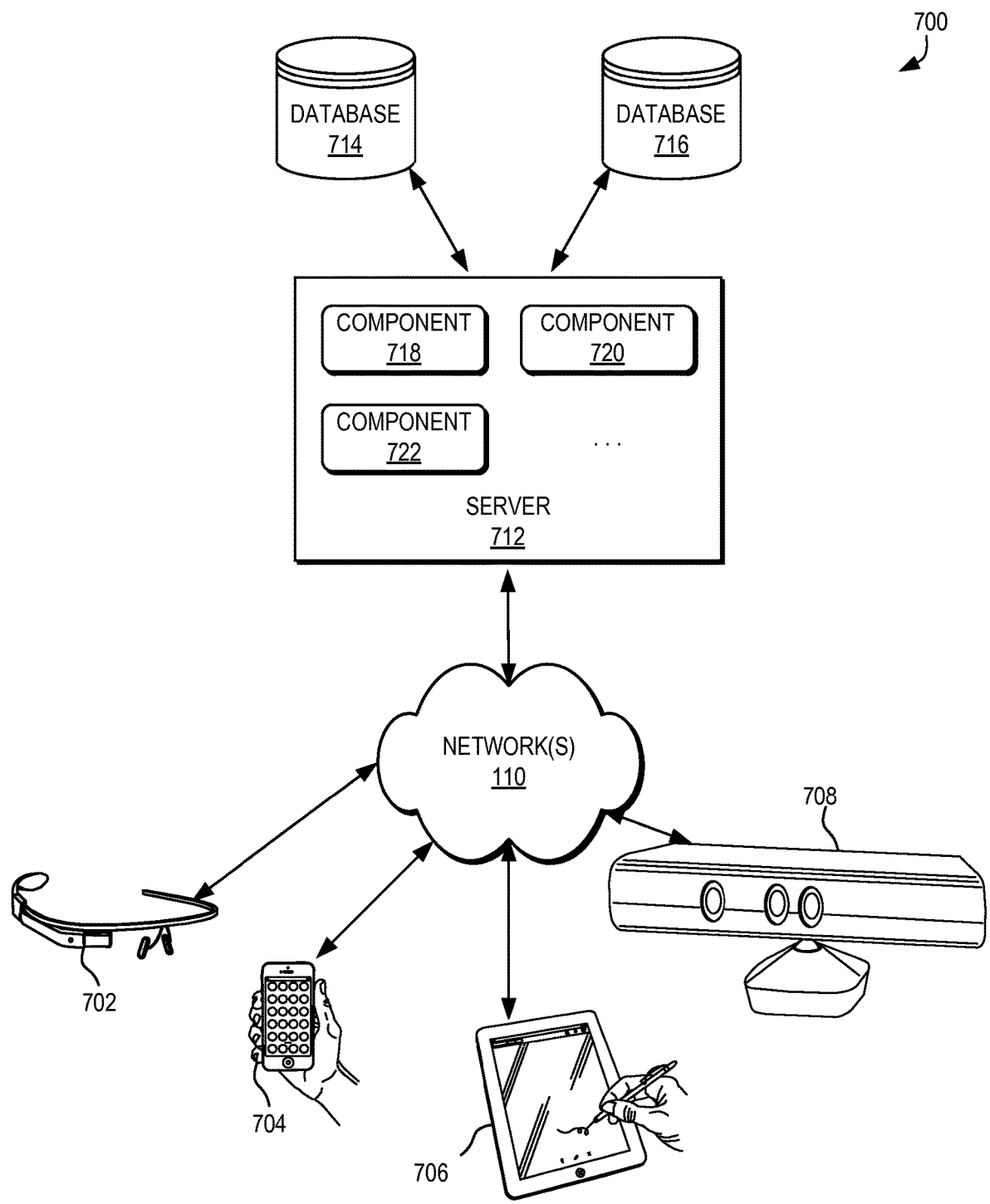
FIG. 4 illustrates a simplified diagram of a distributed system for implementing some embodiments of the present invention.

FIG. 4 illustrates a simplified diagram of a distributed system for implementing some embodiments of the present invention. In the illustrated embodiment, distributed system 700 includes one or more client computing devices 702, 704, 706, and 708 (examples of client device 104), which are configured to execute and operate a client application (e.g., application 114) such as a web browser, proprietary client (e.g., Oracle Forms), or the like over one or more network(s)

110. Server 712 may be communicatively coupled with remote client computing devices 702, 704, 706, and 708 via network 110.

In various embodiments, server 712 may be adapted to run one or more services or software applications such as services and applications that provide code and/or data for displaying hierarchical datasets using high-water mark scrolling. In certain embodiments, server 712 may also provide other services or software applications that can include non-virtual and virtual environments. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 4, software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in FIG. 4 is thus one example of a distributed system for implementing an embodiment system and is not intended to be limiting.

Client computing devices 702, 704, 706, and/or 708 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 110.

Although distributed system 700 in FIG. 4 is shown with four client computing devices, any number of client computing devices may be supported. Other devices, such as devices with sensors, etc., may interact with server 712.

Communication network(s) 110 in distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing as described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. These databases may provide a mechanism for storing information such as user interactions information, usage patterns information, adaptation rules information, and other information used by embodiments of the present invention. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 5:
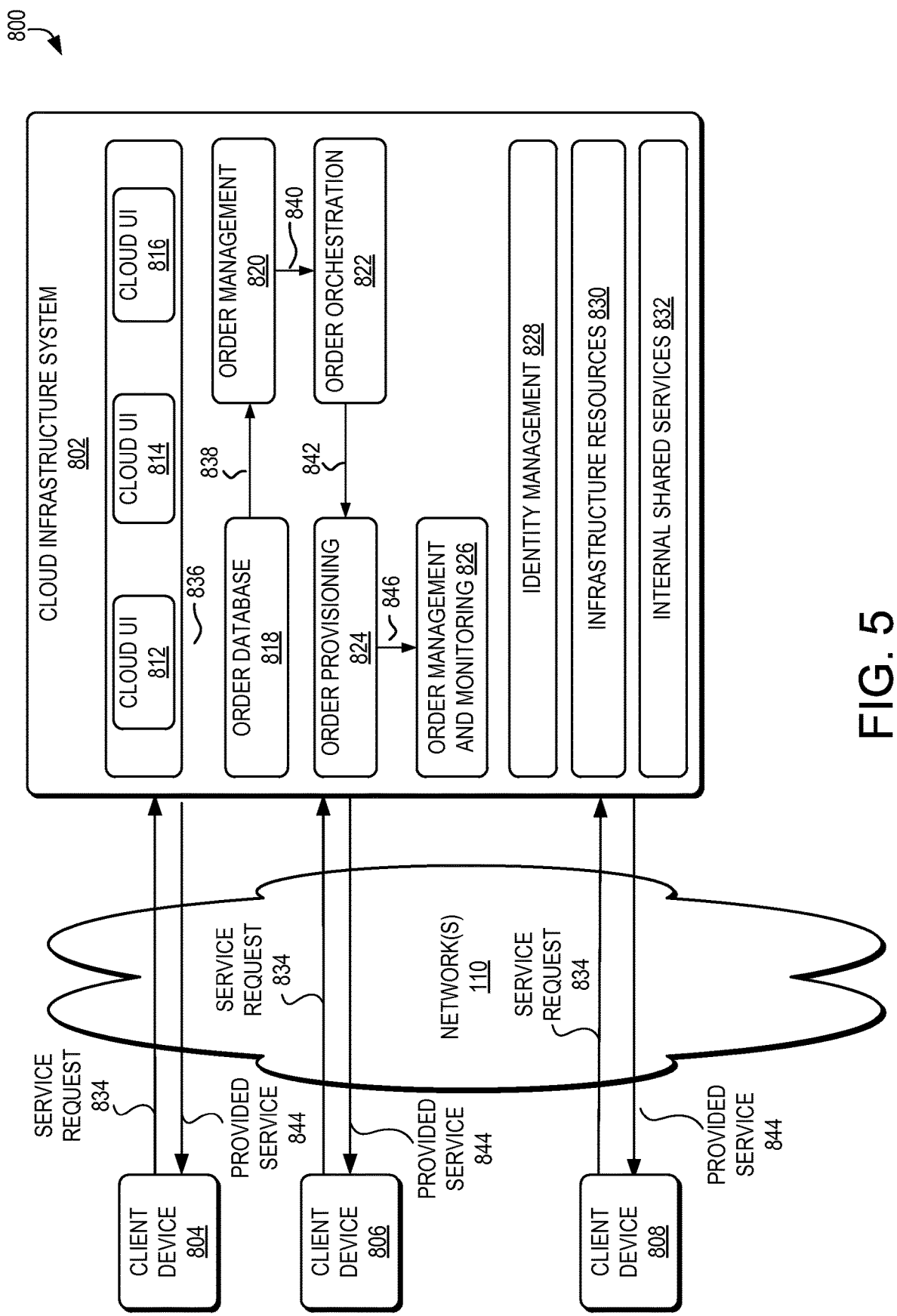
FIG. 5 is a simplified block diagram of one or more components of a system environment in which services may be offered as cloud services, in accordance with some embodiments of the present invention.

In some embodiments, code and/or data for displaying hierarchical datasets using high-water mark scrolling may be offered as services via a cloud environment. FIG. 5 is a simplified block diagram of one or more components of a system environment 800 in which services may be offered as cloud services, in accordance with some embodiments of the present disclosure. In the illustrated embodiment in FIG. 5, system environment 800 includes one or more client computing devices 804, 806, and 808 that may be used by users to interact with a cloud infrastructure system 802 that provides cloud services. Cloud infrastructure system 802 may comprise one or more computers and/or servers that may include those described above for server 712.

It should be appreciated that cloud infrastructure system 802 depicted in FIG. 5 may have other components than those depicted. Further, the embodiment shown in FIG. 5 is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 802, 804, 806, and 808. Client computing devices 804, 806, and 808 may be configured to operate a client application such as a web browser, a proprietary client application (e.g., Oracle Forms), or some other application, which may be used by a user of the client computing device to interact with cloud infrastructure system 802 to use services provided by cloud infrastructure system 802. Although exemplary system environment 800 is shown with three client computing devices, any number of client computing devices may be supported. Other devices such as devices with sensors, etc. may interact with cloud infrastructure system 802.

Communication network(s) 110 may facilitate communications and exchange of data between clients 804, 806, and 808 and cloud infrastructure system 802. Each network may be any type of network familiar to those skilled in the art that can support data communications using any of a variety of commercially-available protocols, including those described above for communication network(s) 110.

In certain embodiments, services provided by cloud infrastructure system 802 may include a host of services that are made available to users of the cloud infrastructure system on demand. In addition to services related to providing code and/or data for displaying hierarchical datasets using high-water mark scrolling, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 802 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 802 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle Corporation) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 802 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 802 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform, and other resources.

In some embodiments, resources in cloud infrastructure system 802 may be shared by multiple users and dynamically re-allocated per demand. Additionally, resources may be allocated to users in different time zones. For example, cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 to enable provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 802, and the like.

In one embodiment, as depicted in FIG. 5, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In an exemplary operation, at 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI) such as cloud UI 812, cloud UI 814 and/or cloud UI 816 and place a subscription order via these UIs.

The order information received by cloud infrastructure system 802 in response to the customer placing an order may include information identifying the customer and one or more services offered by the cloud infrastructure system 802 that the customer intends to subscribe to.

At 836, the order information received from the customer may be stored in an order database 818. If this is a new order, a new record may be created for the order. In one embodiment, order database 818 can be one of several databases operated by cloud infrastructure system 818 and operated in conjunction with other system elements.

At 838, the order information may be forwarded to an order management module 820 that may be configured to perform billing and accounting functions related to the order, such as verifying the order, and upon verification, booking the order.

At 840, information regarding the order may be communicated to an order orchestration module 822 that is configured to orchestrate the provisioning of services and resources for the order placed by the customer. In some instances, order orchestration module 822 may use the services of order provisioning module 824 for the provisioning. In certain embodiments, order orchestration module 822 enables the management of business processes associated with each order and applies business logic to determine whether an order should proceed to provisioning.

As shown in the embodiment depicted in FIG. 5, at 842, upon receiving an order for a new subscription, order orchestration module 822 sends a request to order provisioning module 824 to allocate resources and configure resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. This enables order orchestration module 822 to be isolated from implementation details, such as whether or not services and resources are actually provisioned on the fly or pre-provisioned and only allocated/assigned upon request.

At 844, once the services and resources are provisioned, a notification may be sent to the subscribing customers indicating that the requested service is now ready for use. In some instance, information (e.g. a link) may be sent to the customer that enables the customer to start using the requested services.

At 846, a customer's subscription order may be managed and tracked by an order management and monitoring module 826. In some instances, order management and monitoring module 826 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 800 may include an identity management module 828 that is configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 6:
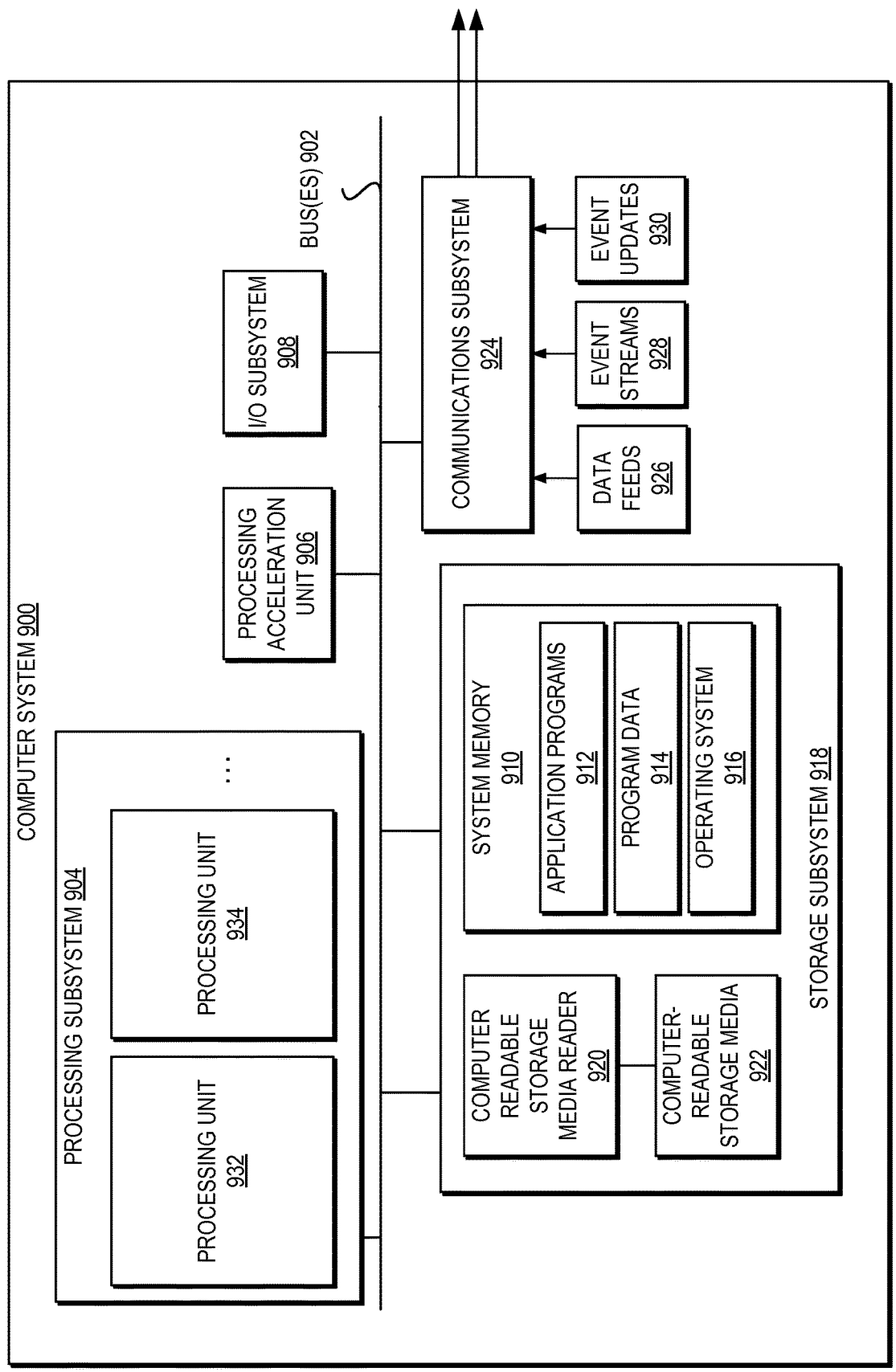
FIG. 6 illustrates an exemplary computer system that may be used to implement certain components according to some embodiments of the present invention.

FIG. 6 illustrates an exemplary computer system 900 that may be used to implement certain components according to some embodiments of the present invention. In some embodiments, computer system 900 may be used to implement any of the various servers and computer systems described above. As shown in FIG. 6, computer system 900 includes various subsystems including a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 may include tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processing units 932, 934, etc. A processing unit may include be one or more processors, including single core or multicore processors, one or more cores of processors, or combinations thereof. In some embodiments, processing subsystem 904 can include one or more special purpose co-processors such as graphics processors (GPUs), digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above for displaying hierarchical datasets using high-water mark scrolling.

In certain embodiments, a processing acceleration unit 906 may be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term "input device" is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information that is used by computer system 900. Storage subsystem 918 provides a tangible non-transitory computer-readable storage medium for storing the basic programming and data constructs that provide the functionality of some embodiments. Software (programs, code modules, instructions) that when executed by processing subsystem 904 provide the functionality described above may be stored in storage subsystem 918. The software may be executed by one or more processing units of processing subsystem 904. Storage subsystem 918 may also provide a repository for storing data used in accordance with the present invention.

Storage subsystem 918 may include one or more non-transitory memory devices, including volatile and non-volatile memory devices. As shown in FIG. 6, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM) or dynamic random access memory (DRAM).

By way of example, and not limitation, as depicted in FIG. 6, system memory 910 may store application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 922 may store programming and data constructs that provide the functionality of some embodiments. Software (programs, code modules, instructions) that when executed by processing subsystem 904 a processor provide the functionality described above may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 922 may provide storage of computer-readable instructions, data structures, program modules, and other data for computer system 900.

In certain embodiments, storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for storing computer-readable information.

In certain embodiments, computer system 900 may provide support for executing one or more virtual machines. Computer system 900 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 900. Accordingly, multiple operating systems may potentially be run concurrently by computer system 900. Each virtual machine generally runs independently of the other virtual machines.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, communications subsystem 924 may receive input communication in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 900 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method, comprising:
presenting, to a user via a display device, a hierarchical user interface module, wherein the hierarchical user interface module is presented comprising a first predetermined number of nodes based on a size of a viewport available for the hierarchical user interface module, wherein the nodes include two or more nodes of a first level of a hierarchy of nodes, wherein a first node of the two more nodes is presented in a list above or prior to a second node of the two or more nodes, wherein the second node is a parent node and has one or more child nodes at a second level of the hierarchy, and wherein the one or more child nodes are not initially presented;

receiving, from the user via a user input device, a first user input associated with the second node that triggers an expansion event of the second node;

responsive to the first user input, performing a first update of the hierarchical user interface module presented to the user, wherein the first update includes replacing a first set of nodes with a second set of nodes, wherein the first set of nodes comprises at least some of the two or more nodes of the first level of the hierarchy including the second node, wherein the second set of nodes comprises the second node and at least some of the one or more child nodes of the second node, and wherein the at least some of the one or more child nodes of the second node replace a portion or all of the at least some of the two or more nodes of the first level of the hierarchy in the first set of nodes, presenting, to the user via the display device, the expansion event of the second node in the hierarchical user interface module, wherein after the first update, the hierarchical user interface module is presented comprising a second predetermined number of the nodes, wherein the nodes include the first node and the second set of nodes, and wherein the first predetermined number of nodes and the second predetermined number of the nodes are a same total number of nodes presented to the user before and after the first update;

receiving, from the user via the user input device, a second user input associated with increasing the second predetermined number of nodes by a set number of nodes based on an incremental value defined independent of the size of the viewport available for the hierarchical user interface module;

responsive to the second user input, performing a second update of the hierarchical user interface module presented to the user, wherein the second update includes increasing the second predetermined number of nodes to a third predetermined number of nodes by the set number of nodes; and presenting, to the user via the display device, the increase of the second predetermined number of nodes to the third predetermined number of nodes by the set number of nodes in the hierarchical user interface module, wherein after the second update, the hierarchical user interface module is presented comprising the third predetermined number of the nodes, wherein the nodes include the first node, the second set of nodes, and a third set of nodes.

2. The method of claim 1, wherein:

performing the second update comprises determining whether the increasing the second predetermined number of nodes to a third predetermined number of nodes would exceed a maximum node value configured such that a predetermined number of nodes can be updated but will max out at the maximum node value, and when the increasing the second predetermined number of nodes to the third predetermined number of nodes would not exceed the maximum node value, performing the second update of the hierarchical user interface module presented to the user.

3. The method of claim 1, wherein:

the hierarchical user interface module includes a user interface element that is selectable by the user to indicate that the user desires to view additional nodes; and the first user input and the second user input are associated with the user selecting the user interface element.

4. The method of claim 1, further comprising:

receiving, from the user via the user input device, a third user input associated with the second node that triggers a contraction event, wherein the third set of nodes comprises at least some of the one or more child nodes of the second node; and responsive to the second user input, performing a third update of the hierarchical user interface module presented to the user, wherein the third update includes replacing the one or more child nodes of the second set of nodes and the third set of nodes with additional nodes from the first level of the hierarchy of nodes.

5. The method of claim 1, wherein performing the first update includes:

transmitting, to a remote server computer, a request for node data; and receiving, from the remote server computer, the node data, wherein the node data includes information associated with the second set of nodes.

6. A computer-program product tangibly embodied in a non-transitory machine-readable storage medium, including instructions configured to cause one or more data processors to perform actions including:

presenting, to a user via a display device, a hierarchical user interface module, wherein the hierarchical user interface module is presented comprising a first predetermined number of nodes based on a size of a viewport available for the hierarchical user interface module, wherein the nodes include two or more nodes of a first level of a hierarchy of nodes, wherein a first node of the two more nodes is presented in a list above or prior to a second node of the two or more nodes, wherein the second node is a parent node and has one or more child nodes at a second level of the hierarchy, and wherein the one or more child nodes are not initially presented;

receiving, from the user via a user input device, a first user input associated with the second node that triggers an expansion event of the second node;

responsive to the first user input, performing a first update of the hierarchical user interface module presented to the user, wherein the first update includes replacing a first set of nodes with a second set of nodes, wherein the first set of nodes comprises at least some of the two or more nodes of the first level of the hierarchy including the second node, wherein the second set of nodes comprises the second node and at least some of the one or more child nodes of the second node, and wherein the at least some of the one or more child nodes of the second node replace a portion or all of the at least some of the two or more nodes of the first level of the hierarchy in the first set of nodes, presenting, to the user via the display device, the expansion event of the second node in the hierarchical user interface module, wherein after the first update, the hierarchical user interface module is presented comprising a second predetermined number of the nodes, wherein the nodes include the first node and the second set of nodes, and wherein the first predetermined number of nodes and the second predetermined number of the nodes are a same total number of nodes presented to the user before and after the first update;

receiving, from the user via the user input device, a second user input associated with increasing the second predetermined number of nodes by a set number of nodes based on an incremental value defined independent of the size of the viewport available for the hierarchical user interface module;

responsive to the second user input, performing a second update of the hierarchical user interface module presented to the user, wherein the second update includes increasing the second predetermined number of nodes to a third predetermined number of nodes by the set number of nodes; and presenting, to the user via the display device, the increase of the second predetermined number of nodes to the third predetermined number of nodes by the set number of nodes in the hierarchical user interface module, wherein after the second update, the hierarchical user interface module is presented comprising the third predetermined number of the nodes, wherein the nodes include the first node, the second set of nodes, and a third set of nodes.

7. A system comprising:

one or more data processors; and a non-transitory computer readable storage medium containing instructions which, when executed on the one or more data processors, cause the one or more data processors to perform actions including:

presenting, to a user via a display device, a hierarchical user interface module, wherein the hierarchical user interface module is presented comprising a first predetermined number of nodes based on a size of a viewport available for the hierarchical user interface module, wherein the nodes include two or more nodes of a first level of a hierarchy of nodes, wherein a first node of the two more nodes is presented in a list above or prior to a second node of the two or more nodes, wherein the second node is a parent node and has one or more child nodes at a second level of the hierarchy, and wherein the one or more child nodes are not initially presented;

receiving, from the user via a user input device, a first user input associated with the second node that triggers an expansion event of the second node;

responsive to the first user input, performing a first update of the hierarchical user interface module presented to the user, wherein the first update includes replacing a first set of nodes with a second set of nodes, wherein the first set of nodes comprises at least some of the two or more nodes of the first level of the hierarchy including the second node, wherein the second set of nodes comprises the second node and at least some of the one or more child nodes of the second node, and wherein the at least some of the one or more child nodes of the second node replace a portion or all of the at least some of the two or more nodes of the first level of the hierarchy in the first set of nodes, presenting, to the user via the display device, the expansion event of the second node in the hierarchical user interface module, wherein after the first update, the hierarchical user interface module is presented comprising a second predetermined number of the nodes, wherein the nodes include the first node and the second set of nodes, and wherein the first predetermined number of nodes and the second predetermined number of the nodes are a same total number of nodes presented to the user before and after the first update;

receiving, from the user via the user input device, a second user input associated with increasing the second predetermined number of nodes by a set number of nodes based on an incremental value defined independent of the size of the viewport available for the hierarchical user interface module;

responsive to the second user input, performing a second update of the hierarchical user interface module presented to the user, wherein the second update includes increasing the second predetermined number of nodes to a third predetermined number of nodes by the set number of nodes; and presenting, to the user via the display device, the increase of the second predetermined number of nodes to the third predetermined number of nodes by the set number of nodes in the hierarchical user interface module, wherein after the second update, the hierarchical user interface module is presented comprising the third predetermined number of the nodes, wherein the nodes include the first node, the second set of nodes, and a third set of nodes.

8. A system, comprising:

a client device comprising a display device, one or more network interfaces, one or more processors, and an application executed by the one or more processors, wherein the application:

presents, to a user via the display device, a hierarchical user interface module, wherein the hierarchical user interface module is presented comprising a first predetermined number of nodes based on a size of a viewport available for the hierarchical user interface module, wherein the nodes include two or more nodes of a first level of a hierarchy of nodes, wherein a first node of the two more nodes is presented in a list above or prior to a second node of the two or more nodes, wherein the second node is a parent node and has one or more child nodes at a second level of the hierarchy, and wherein the one or more child nodes are not initially presented;

receives, from the user via a user input device, a first user input associated with the second node that triggers an expansion event of the second node; and responsive to the first user input, performs a first update of the hierarchical user interface module presented to the user, wherein the first update includes:

replacing a first set of nodes with a second set of nodes, wherein the first set of nodes comprises at least some of the two or more nodes of the first level of the hierarchy including the second node, wherein the second set of nodes comprises the second node and at least some of the one or more child nodes of the second node, and wherein the at least some of the one or more child nodes of the second node replace a portion or all of the at least some of the two or more nodes of the first level of the hierarchy in the first set of nodes, and transmitting a first request to a server computer for first node data associated with the second set of nodes;

receives, from the user via the user input device, a second user input associated with increasing a second predetermined number of nodes by a set number of nodes based on an incremental value defined independent of the size of the viewport available for the hierarchical user interface module;

responsive to the second user input, performing a second update of the hierarchical user interface module presented to the user, wherein the second update includes:

increasing the second predetermined number of nodes to a third predetermined number of nodes by the set number of nodes, wherein the hierarchical user interface module is presented comprising the third predetermined number of the nodes, and wherein the nodes include the first node, the second set of nodes, and a third set of nodes; and transmitting a second request to the server computer for second node data associated with the third set of nodes; and the server computer comprising one or more network interfaces, one or more processors, a non-transitory computer readable storage medium that stores hierarchical data of the hierarchy of nodes, and a user interface (UI) module that:

receives the request for the first node data from the client device;

identifies the first node data from the stored hierarchical data; and transmits the first node data to the client device, wherein upon receipt of the first node data by the client device, the application further presents, to the user via the display device, the expansion event of the second node in the hierarchical user interface module, wherein after the update, the hierarchical user interface module is presented comprising the second predetermined number of the nodes, wherein the nodes include the first node and the second set of nodes, and wherein the first predetermined number of nodes and the second predetermined number of the nodes are a same total number of nodes presented to the user before and after the first update;

receives the request for the second node data from the client device;

identifies the second node data from the stored hierarchical data; and transmits the second node data to the client device, wherein upon receipt of the second node data by the client device, the application further presents, to the user via the display device, the increase of the second predetermined number of nodes to the third predetermined number of nodes by the set number of nodes in the hierarchical user interface module, wherein after the second update, the hierarchical user interface module is presented comprising the third predetermined number of the nodes, wherein the nodes include the first node, the second set of nodes, and the third set of nodes.

* * * * *

UNITED STATES PATENT AND TRADEMARK OFFICE
CERTIFICATE OF CORRECTION

PATENT NO. : 10,691,299 B2  
APPLICATION NO. : 14/863786  
DATED : June 23, 2020  
INVENTOR(S) : van den Broek et al.

Page 1 of 1

It is certified that error appears in the above-identified patent and that said Letters Patent is hereby corrected as shown below:

On the Title Page

On second page, Column 2, under Other Publications, Line 5, delete "http://wvvw.inst-" and insert -- http://www.inst- --, therefor.

On third page, Column 1, under Other Publications, Line 25, delete "datedd" and insert -- dated --, therefor.

In the Specification

In Column 10, Line 18, delete "UNIXO" and insert -- UNIX® --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*